June 3, 1958 J. O. CREEK ET AL 2,837,011
ROOT PLATFORM MILLING FIXTURE
Filed Feb. 6, 1956 2 Sheets-Sheet 2

INVENTORS
J. O. CREEK
E. W. DAWSON
By: Maybee & Legris
Att'ys

Page Patented June 3, 1958

2,837,011

ROOT PLATFORM MILLING FIXTURE

John Oliver Creek, Brampton, Ontario, and Edward William Dawson, Toronto, Ontario, Canada, assignors to Orenda Engines Limited, Malton, Ontario, Canada, a corporation Application February 6, 1956, Serial No. 563,539

8 Claims. (Cl. 90—13)

This invention relates to a metal working machine for machining a workpiece, and particularly for machining the root platform and fillet radius of gas turbine blades.

In the manufacture of gas turbine blades as previously proposed, a blade-blank, in the form of a rough casting or stamping, is machined to its correct profile, or substantially to its correct profile, adjacent its root portion to provide a "run out" for a tool which is used to machine the longitudinal aerofoil surface of the blade. After the aerofoil surface has been machined, the root platform of the blade is machined, and, finally, the fillet between the root platform and the aerofoil portion of the blade is machined using a ball-ended rotary cutter.

This process is a costly one as it involves the machining of three separate portions of the blade in sequence, which process is of necessity a long one due to the required accuracy of the work. Also, due to there being three independent machining operations, three separate machines are required, or a complex machine having three machining stations has to be provided, this difficulty being further complicated by the fact that the machining has to be carried out on one concave and one convex surface of the blade. A further disadvantage that arises with previously proposed machines is that due to their complexity highly skilled labour is required to operate them.

An object of this invention is to provide a machine in which the "run out," the root platform, and the fillet radius of a gas-turbine blade can be machined in one operation.

A further object is to provide a machine of simple design with which both the concave and convex surface of the "run out," the root platform and the fillet radius can be machined.

A still further feature is to provide a machine which is simple in construction and which can be operated by relatively unskilled labour.

The foregoing and still further objects and advantages of the invention will become apparent from a study of the following description when read in conjunction with the accompanying drawings, in which like reference numerals indicate corresponding parts throughout the several views, and in which.

Figure 1:
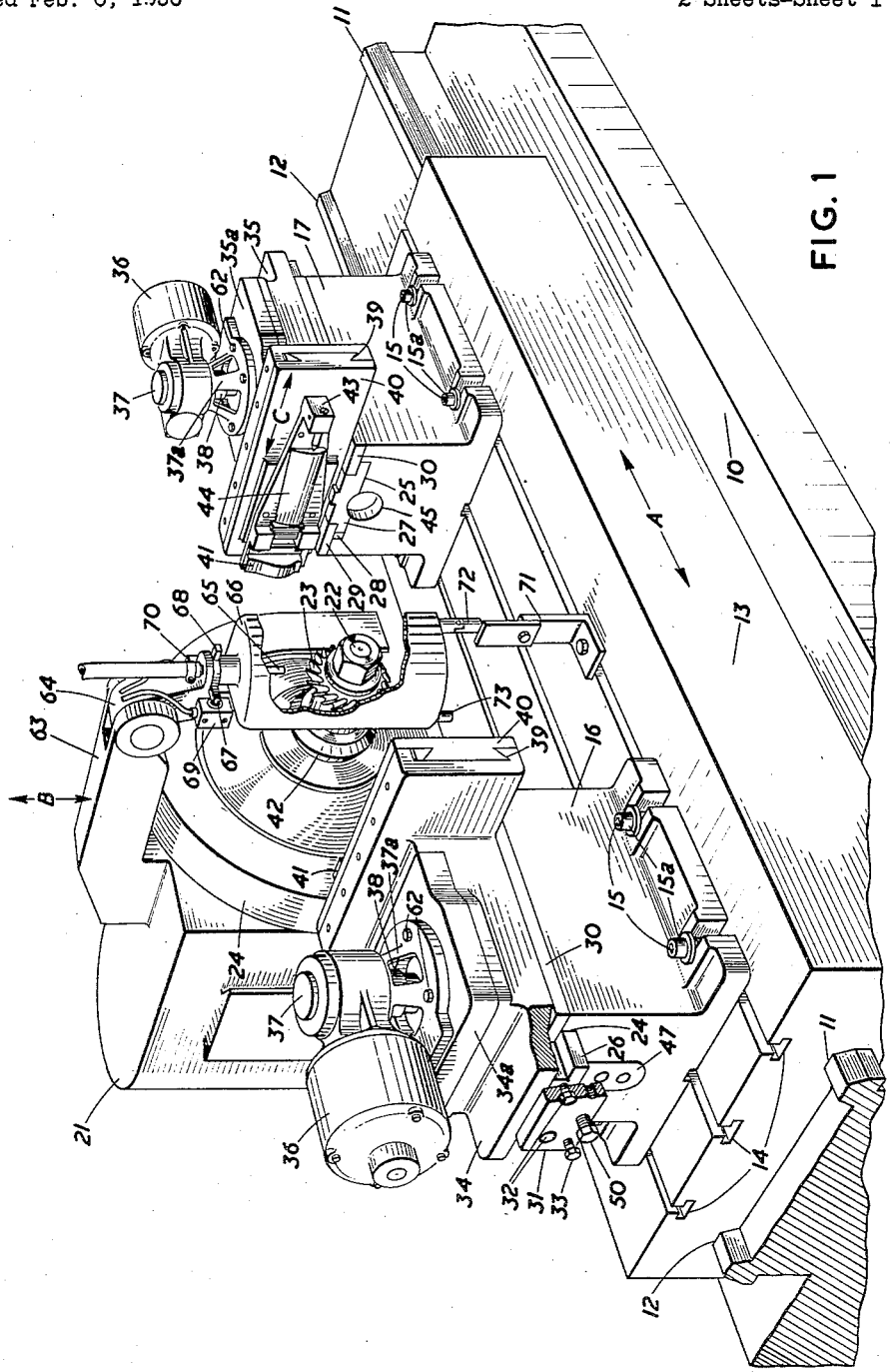
Figure 1 is a fragmentary perspective view of a machine according to the invention for machining both the concave and convex "run out," fillet radius, and the root platform of a gas turbine blade.

Referring to Figure 1, the machine includes a bed 10 which is mounted on a suitable base (not shown), the bed having guideways 11, 12 on which a table 13 is mounted for reciprocation longitudinally of the guideways, as indicated by the arrows A.

The table 13 has undercut grooves 14 machined in its upper surface which receive the heads of locking bolts 15 by which blocks 16 and 17 are respectively secured to the table in a predetermined position. The bolts 15 are provided with nuts 15a by which the blocks can be clamped to the upper surface of the table.

Mounted for vertical movement in guideways (not shown) carried by the bed 10 is a slide 21, the slide carrying journal bearings (not shown) for a spindle 22 to which is secured a cutter 23, and the slide is movable in the direction of the arrows B. The spindle 22 is provided with a large fly wheel 24 to damp vibrations set up by the cutter during the cutting operation, and thus prevent the cutter from "chattering" with the production of undulations in the surface of the machined work-piece, and is driven in any convenient manner, for example by an electric motor (not shown).

The blocks 16 and 17 are provided with guideways 24, 25, respectively, in which are received slides 26, 27, respectively, the guideways being provided with packing strips 28. The slides are retained in the guideways by plates 29, 30 which are secured to the upper surface of the blocks 16, 17 by means of screws, and the slides are provided with end plates 31 which are bolted to the slides at 32. Adjustable stops 33 are provided on the end plates 31 to limit the extent to which the slides can be moved towards the spindle 22.

Rigidly secured to the slides 26, 27, respectively are supports 34, 35, respectively, for electric motors 36 which provide a drive through a reduction gear box 37 to a spindle 38 for a purpose later described. The supports 34, 35 are formed at their mutually presented sides with dovetail ways 39 which extend in a direction transverse to the ways 11, 12, and in which are received cross slides 40, the ways 39 guiding the slides 40 for movement in a direction parallel to the axis of the spindle 22, as indicated by the arrows C.

Mounted on the cross slides 40 are patterns 41 which are to cooperate, for a purpose later described, with a roller 42 journalled on the spindle 22 and of the same diameter as the cutter 23. The cross slides each carry a holder 43 for supporting a work-piece in the form of a blade blank 44 (only the one associated with the block 17 being visible) in a predetermined position with respect to the pattern 41.

Figure 2:
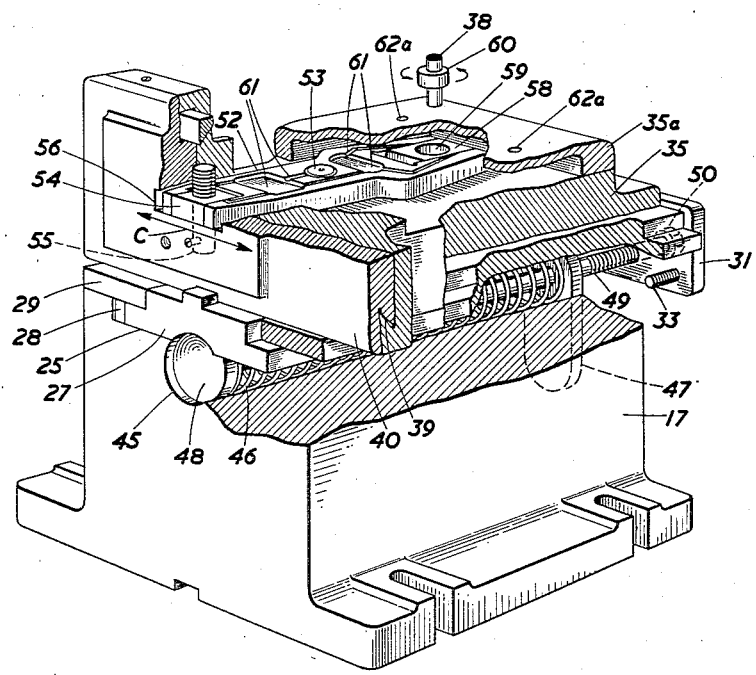
Figure 2 is a sectional perspective view showing in detail and to a larger scale a holder for a work-piece shown in Figure 1; and, Figure 3 is a fragmentary perspective view showing the profile of a rotary cutting tool and the corresponding profile machined on a blade by the machine according to Figures 1 and 2.

Referring now to Figure 2 which shows the block 17 in a broken away form, the block has a longitudinal bore 45 in which is received a compression spring 46. The spring reacts between a plate 47 fast with the block and a cylindrical plug 48 fast with a rod 49 which passes through the plate 47 and the end plate 31. The rod 49 passes freely through the plate 47, and at its end which passes through the end plate 31 is threaded and is received in a complementary threaded bore of the end plate. Thus, by rotating the rod 49, by means of a hexagon head 50 provided on the rod, the rod will move the plug 48 to increase or decrease the compression of the spring 45, and thus increase or decrease the bias acting through the plug 48, rod 49, and plate 31 on the slide 27. It will be observed that the spring 45 biases the slide 27 in a direction towards the spindle 22.

The support 35 is provided with a cover plate 35a which encloses a mechanism for reciprocating the cross slide 40 in a direction parallel to the axis of the cutter, the mechanism within the cover plate 34a of the block 16 being of identical construction and not described herein in detail. The mechanism for reciprocating the slide 40 consists of a rocker arm 52 which is journalled intermediate its ends on a pivot 53. At its end adjacent the slide 40 the rocker arm is bifurcated to embrace a block 54 which is journalled on a pivot 55 in a mortice 56 of the slide. The other end of the lever is similarly bifurcated to embrace a block 58 having a bore 59 which is to receive an eccentric cam 60 keyed to the motor driven shaft 38, and the upper surface of the rocker arm is provided with reservoirs and channels 61 for the supply of lubricant to the blocks 54 and 58.

The electric motor 36 and gear box 37 are secured to the cover plate 35a by means of bolts 62 which pass through a flange of a spider 37a integral with the gear box, and which are received in threaded holes 62a of the cover plate.

Mounted on the slide 21 is an arm 63 to which is hinged a bracket 64 supporting a pipe 65 for supplying suds or cutting oil to the cutter, and journalled for rotation about the pipe is a shield 66. The shield has at its upper end two arms 67, 68 which are adapted to engage micro-switches 69, 70 when the cover is swivelled in the appropriate direction around the tube 65. This is automatically done by a stop 71 mounted on the table 11 which engages pins 72, 73 fast with the lower edge of the shield. The shield is adapted to expose the cutter to only one of the work-pieces at a time, and as shown in Figure 1 is exposing the cutter to the work-piece 44 carried by the holder 43 of the block 17. In the position of the shield shown, the arm 67 is engaging the movable element of the micro-switch 69 to establish a circuit for the motor 36 on the block 17.

In use, a blade blank 44 is set up in the holder 43, and an appropriate pattern 41 is positioned on the slide 40. The table 11 is then moved to advance the pattern 41 into contact with the roller 42, the pattern 41, as it contacts the roller 42, causing the spring 46 to be compressed to provide a substantially constant bias for holding the pattern 41 in engagement with the roller. The drive to the cutter 23 and the power supply to the electric motor 36 of the block 17 are established before movement of the table, so that as the pattern 41 advances to the roller the slide 40 is being reciprocated in a direction parallel to the axis of the rotary cutter 23 by its motor 36, and the cutter is driven in readiness for effecting machining of the blade-blank.

When the cutter has been fed into the blade-blank the slide 21 is moved in a vertical direction to cause the roller 42 to traverse the pattern 41, with a consequence that the blade-blank 44 is fed towards or away from the cutter under the control of the pattern at the same time as it is being reciprocated axially of the cutter. The machining is started with the roller in contact with one end of the pattern, and the machining is effected in one sweep of the surface to be machined.

Figure 3:
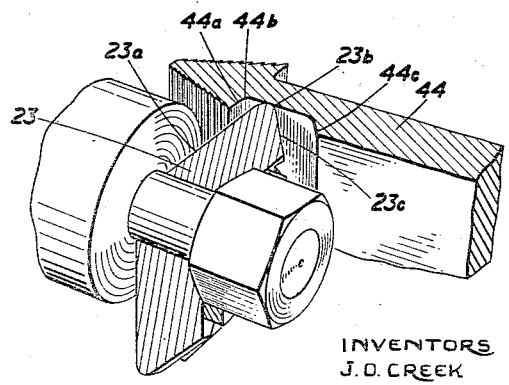

The profile of the cutter and of the surface machined blade are shown in Figure 3, the cutter having a radial cutting surface 23a for machining the flat surface 44a of the root platform, a radiused surface 23b for machining the fillet radius 44b of the blade, and a frusto-conical surface 23c for machining the "run out" 44c of the blade. It will be observed that the surfaces 44a and 44b are a greater distance from the surface 44c on the blade than are the surfaces 23a and 23b, and the surface 23c of the cutter. This is due to the reciprocation of the block axially of the cutter during the machining, which allows the machining to be carried out in a direction axially of the block, with a consequent improvement in the surface finish of the machined surface.

The construction of the members mounted on the block 16 is identical to that of the members mounted on the top of the block 17, with the one exception that the pattern 41 associated with the block 16 will be concave, whereas the cam 41 associated with the block 17 is convex so that a blade-blank can be machined on its convex surface and then re-positioned on the block 16 for its concave surface to be machined.

When the blade-blank is mounted on the block 16, the table 13 is traversed to bring the cam 41 of the block 16 into engagement with the roller 42 in the manner as hereinbefore described, and, during this movement the stop 71 engages the pin 72 to move the shield 66 into a position in which the cutter 23 is presented to the block 16, the arm 68 actuating the micro-switch 70 during that movement to establish the circuit of the motor 36 on the block 16.

When the table is again to be moved to machine a blade-blank positioned on the block 17, the stop 71 will engage the pin 73 to again move the shield 66 into a position in which the cutter is exposed to the blade-blank.

What we claim as our invention is:

1. A pattern controlled metal working machine, including a spindle, a cutter secured to the spindle, means for rotating the spindle and cutter, a holder for a workpiece, a pattern mounted for movement in unison with the holder, a follower for the pattern arranged in fixed relationship to the cutter, means for biasing the pattern and holder towards the follower and cutter respectively, means for traversing the follower past the pattern and the cutter past the holder in a direction transverse to the axis of the spindle, and means for effecting continuous reciprocatory motion of the pattern and holder relatively to the follower and the cutter in a direction parallel to the axis of the spindle as the cutter is traversed past the holder.

2. A pattern controlled metal working machine, including a horizontal bed having guideways extending longitudinally of its upper surface, a table slidably mounted on the guideways, a spindle arranged above the table for its axis to be transverse to the direction of movement of the table, a cutter secured to the spindle, a drive for the spindle, means for moving the spindle in a direction normal to the table, a slide mounted on the table for movement in the direction transverse to the direction of movement of the table and parallel to the axis of the spindle, means for continuously reciprocating the slide, a pattern and a holder for a workpiece carried by the slide, a follower for the pattern arranged in a predetermined fixed position with respect to the axis of the spindle, and means for resiliently biasing the slide carrying the pattern and the holder towards the follower and the cutter respectively.

3. A pattern controlled metal working machine, including a horizontal bed having guideways extending longitudinally of its upper surface, a table slidably mounted on the ways, a spindle arranged above the table for its axis to be transverse to the direction of movement of the table, a cutter and a flywheel secured to the spindle, a drive for the spindle, means for moving the spindle in a direction normal to the table, a slide mounted on the table for movement in a direction parallel to the guideways of the table, means biasing the slide in a direction towards the spindle, a second slide mounted on the first slide for movement in a direction parallel to the axis of the spindle, a pattern and a holder for a workpiece carried by the second slide, a follower in the form of a roller journalled co-axially of the spindle for co-action with the pattern, and means for reciprocating the second slide, the means including a pivot fast with the first slide and extending in a direction transverse to the direction of movement of the second slide, an arm journalled on the pivot and having one end in driving engagement with the second slide, and means for rocking the arm to impart a continuously reciprocatory motion to the second slide in a direction parallel to the axis of the spindle.

4. A pattern controlled metal working machine, including a horizontal bed having guideways extending longitudinally of its upper surface, a table slidably mounted on the ways, a spindle arranged above the table for its axis to be transverse to the direction of movement of the table, a cutter and a flywheel secured to the spindle, a drive for the spindle, means for moving the spindle in a direction normal to the table, a slide mounted on the table for movement in a direction parallel to the guideways of the table, a spring for biasing the slide in a direction towards the spindle, a second slide mounted on the first slide for movement in a direction parallel to the axis of the spindle, a pattern and a holder for a workpiece carried by the second slide, a follower in the form of a roller journalled co-axially of the spindle for co-action with the pattern, and means for reciprocating the second slide, the means including a pivot fast with the first slide and extending in a direction transverse to the direction of movement of the second slide, a block journalled in an aperture of the second slide, an arm journalled on the pivot and having one end bifurcated to embrace the block, the other end of the lever being bifurcated, a second block engaged by the said other bifurcated end, the second block having an aperture in which is received an eccentric cam, and a motor for rotating the eccentric cam to impart a continuously reciprocatory motion to the arm to reciprocate the second slide in a direction parallel to the axis of the spindle.

5. A pattern controlled metal working machine according to claim 1, including a flywheel arranged co-axially of and secured to the spindle to damp torsional vibrations set up in the spindle by the cutter.

6. A pattern controlled metal working machine according to claim 2, including a flywheel arranged co-axially of and secured to the spindle to damp torsional vibrations set up in the spindle by the cutter.

7. A pattern controlled metal working machine according to claim 2, including a roller journalled on the spindle co-axially of the cutter, the roller providing the said follower.

8. A pattern controlled metal working machine according to claim 3, in which the means for reciprocating the second slide includes a block having opposed parallel sides, and means journalling said block for rotation about an axis transverse to the direction of movement of said second slide, the said arm being bifurcated at its end adjacent the block for the bifurcate portion to embrace the parallel sides of the block.

References Cited in the file of this patent

UNITED STATES PATENTS 2,721,494    Whitfield  ---------------- Oct. 24, 1955

FOREIGN PATENTS 965,092    France  ------------------ Feb. 8, 1950